(12) United States Patent
Stenlund et al.

(10) Patent No.: US 6,516,423 B1
(45) Date of Patent: Feb. 4, 2003

(54) SYSTEM AND METHOD FOR PROVIDING MULTIPLE QUEUE REDUNDANCY IN A DISTRIBUTED COMPUTING SYSTEM

(75) Inventors: Bo Stenlund, Fountain Valley, CA (US); Orjan Savela, Huntington Beach, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/422,839

(22) Filed: Oct. 21, 1999

(51) Int. Cl.[7] .............................................. G06F 11/00
(52) U.S. Cl. ................................................. 714/4; 714/6
(58) Field of Search ........................... 714/4, 13, 15, 714/18, 20

(56) References Cited

U.S. PATENT DOCUMENTS

| | | | | |
|---|---|---|---|---|
| 5,566,297 A | * | 10/1996 | Devarakonda et al. | 714/13 |
| 5,590,318 A | * | 12/1996 | Zbikowski et al. | 707/202 |
| 5,649,092 A | * | 7/1997 | Price et al. | 714/15 |
| 5,796,934 A | * | 8/1998 | Bhanot et al. | 714/15 |
| 5,944,838 A | * | 8/1999 | Jantz | 714/6 |
| 6,185,695 B1 | * | 2/2001 | Murphy et al. | 709/221 |
| 6,278,988 B1 | * | 8/2001 | Lau et al. | 705/30 |
| 6,353,834 B1 | * | 3/2002 | Wong et al. | 707/100 |
| 6,385,616 B1 | * | 5/2002 | Gardner | 707/1 |

* cited by examiner

*Primary Examiner*—Robert Beausoliel
*Assistant Examiner*—Marc Duncan
(74) *Attorney, Agent, or Firm*—Jenkens & Gilchrist, P.C.

(57) ABSTRACT

A method and system are disclosed for maintaining a central queue for sequentially processing data within a distributed processing system. The method and system transports data to a first central queue from one or more remote processing locations for subsequent processing. Each processing location maintains in memory data transported to the first central queue as well as information relating to the data transported. Upon the processing location associated with the first central queue experiencing a failure, a second central queue is created from the data maintained in the memory of each remote processing location. The information relating to the data transported to the first central queue is utilized so that the contents of the second central queue substantially match the contents of the first central queue prior to the failure. In this way, a redundant or backup central queue can be formed without the expense of maintaining dual central queues during normal operation of the distributed processing system.

28 Claims, 2 Drawing Sheets

SYSTEM AND METHOD FOR PROVIDING MULTIPLE QUEUE REDUNDANCY IN A DISTRIBUTED COMPUTING SYSTEM

BACKGROUND OF THE INVENTION

1. Technical Field of the Invention

The present invention relates to providing redundant data storage devices, and particularly to a method and system for recreating a central queue in a distributed processing system without the expense of maintaining dual storage devices during normal operation of the system.

2. Background of the Invention

Today's computing networks often utilize central devices for handling data from a number of remote processing units. A central queue, for instance, is typically capable of receiving data from remote processing units, temporarily maintaining the data and providing the data for sequential processing thereof by a central processing unit. In order to prevent the distributed processing system from being halted upon the occurrence of one or more failures associated with the operation of the central queue, a backup central queue is typically provided. In existing systems, the contents of the backup central queue are updated in real time whenever the contents of the central queue are updated. In this way, an exact copy of the central queue is available for use as the central queue whenever the central queue fails.

A primary shortcoming in conventional distributed processing systems employing a backup central queue is the additional usage of system resources necessary to maintain and/or update a duplicate copy of the central queue in real time. Based upon the foregoing, there is a need for more efficiently providing multiple queue redundancy within a distributed processing system.

SUMMARY OF THE INVENTION

The present invention overcomes the shortcomings in prior systems and thereby satisfies a significant need for providing multiple queue redundancy without the expense of added system usage in maintaining the backup queue in real time. According to a preferred embodiment of the present invention, a distributed processing system or network includes a plurality of processing units, each of which includes a local queue. A first processing unit includes a central queue. Each processing unit includes system software and necessary hardware for transporting and/or sending data between processing units in the distributed network. The software and hardware also allows data that is intended to be centrally processed, such as by an electronic mail or print server, to be transported to the central queue from any processing unit. Data transported by a processing unit to the central queue is also maintained by the transporting processing unit, together with processing information relating to the data. The processing information may include a time stamp marking the time the corresponding data was transported to the central queue, or priority information indicating the level of priority for centrally processing the data. By maintaining the redundant data locally at each processing unit, system-level resources are not utilized during normal operation in order to maintain a second or backup central queue.

In the event the central queue fails or otherwise malfunctions, the system software and hardware at each processing unit recreates the central queue at another processing unit in the network. Specifically, data that was previously transported to the central queue is transported from each processing unit to the location of the new central queue, together with the processing information relating to the data. The system determines the order of data in the new central queue based upon the processing information (time stamp and/or priority information) transported with the data. In this way, the new central queue is created which substantially matches the original central queue prior to the failure thereof.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
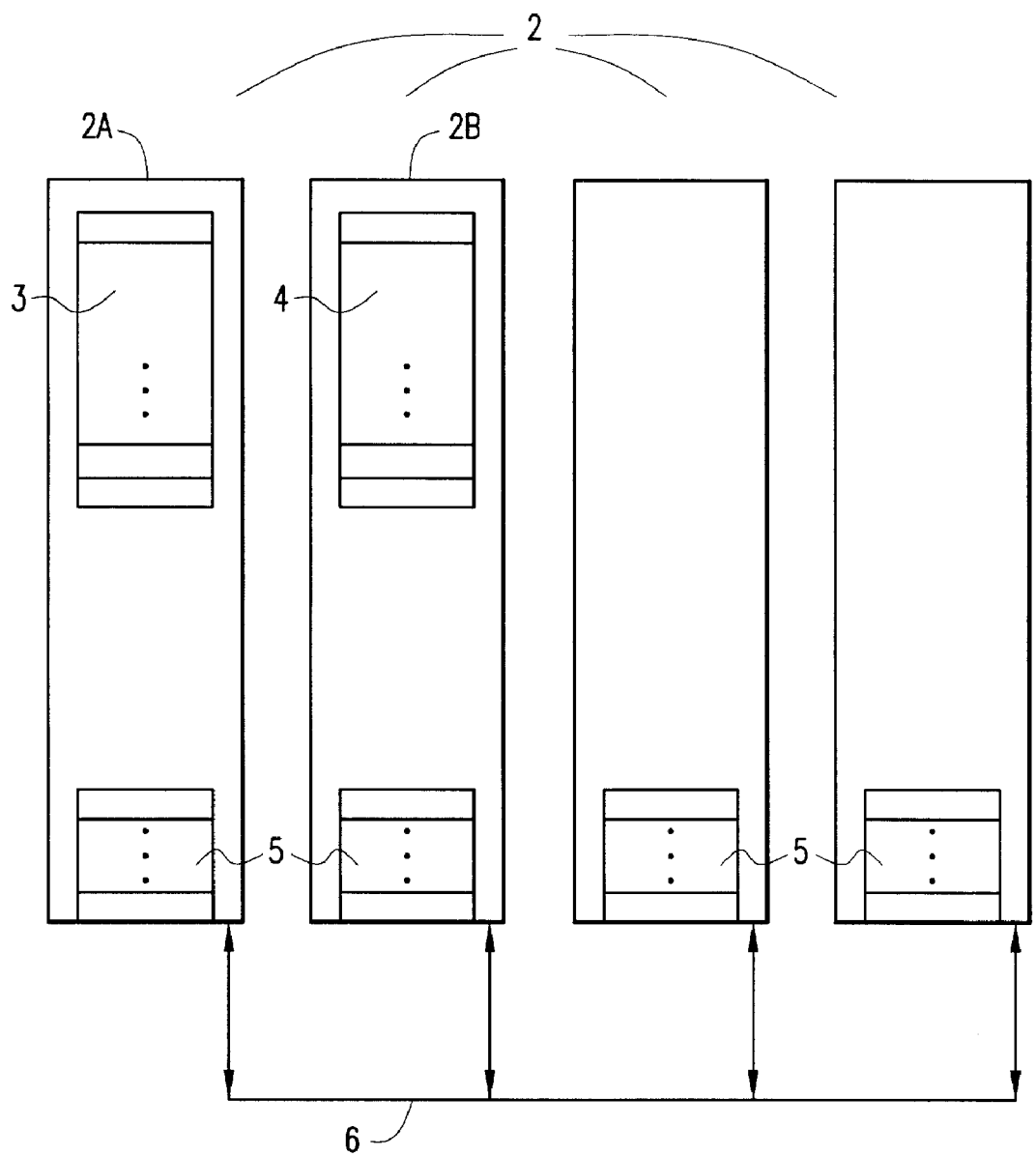
FIG. 1 is a function block diagram of a distributed processing network according to a preferred embodiment of the present invention.

Referring to FIG. 1, there is shown a distributed processing network 1 according a preferred embodiment of the present invention. Distributed network 1 includes a plurality of processing units 2. Each processing unit 2 includes hardware and software, such as a processor and corresponding instruction code therefor, for performing a number of processing tasks that are dependent upon the particular application of distributed network 1. Processing units 2 are also capable of communicating with each other within distributed network 1 over a media 6 connected between processing unit 2.

At least one processing unit 2A includes a central queue 3 in which data that is intended to be centrally processed, such as by an electronic mail or printer server, is temporarily maintained. Central queue 3 may, for instance, be configured as a first-in-first-out (FIFO) queue in which data that has been maintained in central queue 3 the longest is retrieved therefrom for processing. It is understood that central queue 3 may be configured in other ways, such as a last-in-first-out (LIFO) queue.

At least one other processing unit 2, such as processing unit 2B, may include a backup queue 4 which is intended to be utilized as the central queue in the event central queue 3 is associated with a system failure. During normal operation in which data is provided to and by central queue 3 without encountering failure, system software and hardware of processing unit 2B do not similarly update backup queue 4 so that the contents of backup queue 4 matches central queue 3. Instead, processing unit 2B merely allocates sufficient memory and other hardware within processing unit 2B during normal operation for possible use as a central queue in the event central queue 3 is associated with a system failure.

It is understood that any processing unit 2 may include a backup queue 4, and that one or more backup queues 4 may not be dedicated within one or more particular processing units 2 until after central queue 3 is associated with a system failure.

Each processing unit 2 includes system software and corresponding hardware for transporting data to central queue 3 for subsequent central processing. In addition, each processing unit 2 further includes a local queue 5. System software and hardware within each processing unit 2 dedicates memory within processing unit 2 and stores data therein that is transported to central queue 3 from processing unit 2. Each processing unit 2 further generates processing information for each transmission of data from processing unit 2 to central queue 3, and stores the processing information with the corresponding data that is stored in local queue 5. The processing information may, for example, include a time stamp of the time the corresponding data was transported to central queue 3 or priority information relating to a level of processing priority within central queue 3. Data may be removed from a local queue 5 upon the counterpart data in central queue 3 being retrieved therefrom.

Instead of updating backup queue 4 in substantially real time during normal operation and thereby increasing the network's workload, distributed network 1 further includes system software and associated hardware, such as software and associated hardware within processing unit 2B, for creating backup queue 4 following a system failure involving central queue 3. In particular, processing units 2 are capable of transporting data and corresponding processing information from their respective local queues 5 to backup queue 4 upon the detection of a system failure involving central queue 3. Processing unit 2B, the processing unit that includes backup queue 4, is capable of collecting the data from the processing units 2 and compiling the data for backup queue 4. The processing information received by processing unit 2B is used thereby to calculate the order for processing data within backup queue 4. For example, system software and associated hardware within processing unit 2B may utilize the time stamp and/or priority information for each data item within backup queue 4 so as to suitably order the data to match the order of data within central queue 3 prior to failure.

Figure 2:
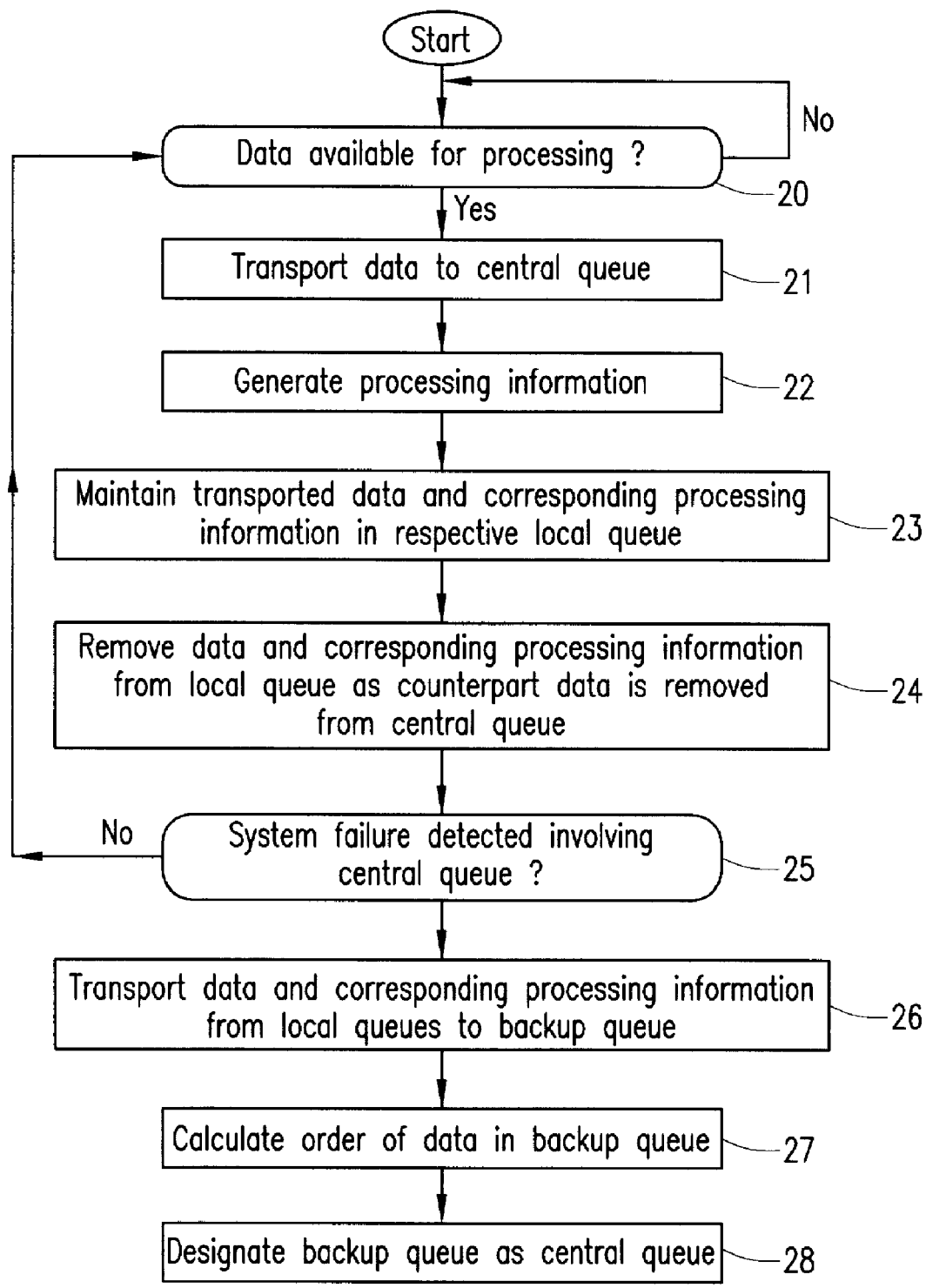
FIG. 2 is a flow chart illustrating an operation of the preferred embodiment of the present invention shown in FIG. 1.

The operation of the distributed network 1 according to a preferred embodiment of the present invention will be described with reference to FIG. 2. Upon data being identified by a processing unit 2 for central processing at step 20, the identified data is transported to central queue 3 at step 21. Around the same time that the data is transported, processing information for the transported data is generated at step 22. The transported data may include, for example, a time stamp marking the time the corresponding data was transported to central queue 3, or priority information relating to a preferred level of processing priority.

Next, at step 23 a copy of the data transported during step 21 and the corresponding processing information is maintained within the local queue 5 of the processing unit 2 from which the data was transported.

Once data is loaded within central queue 3 and a local queue 5, the data in central queue 3 is available for processing. As data is removed from central queue 3 for processing, the counterpart data in a local queue 5 is removed at step 24.

In the event a system failure involving central queue 3 is detected and communicated to each processing unit 2 at step 25, data in each local queue 5 is transported to backup queue 4 at step 26, together with the corresponding processing information. At this point, backup queue 5 has all of the data central queue 3 had prior to failure. Processing unit 2B determines the correct order of the data at step 27 in order to match the order of the data appearing in central queue 5, based upon the processing information. In particular, processing unit 2B utilizes the time stamp and priority information of the data to determine the correct order of data within backup queue 4. Thereafter, backup queue 4 may be designated at step 28 as the central queue for temporarily handling data for processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of maintaining data in a distributed processing system including a number of processing locations, one processing location including a first central queue for processing data provided by each processing location, the method comprising the steps of:

transporting data from each processing location to the first central queue for subsequent processing;

for each processing location, maintaining data transported to the first central queue from the processing location and processing information corresponding to the transported data;

for each processing location, removing the data and respective processing information therefrom upon the corresponding data being removed from the first central queue; and creating a second central queue in a processing location that is different from the processing location having the first central queue and substantially matching the first central queue, the step of creating being in response to an affirmative determination that the processing location having the first central queue experienced a failure, the second central queue being created based upon the processing information maintained in the processing locations.

2. The method of claim 1, wherein the step of creating comprises the step of:

transporting data maintained at each processing location to the second central queue.

3. The method of claim 2, wherein the step of creating further comprises the step of:

determining the processing order for the data in the second central queue based upon the processing information in the processing locations.

4. The method of claim 3, wherein the step of creating further comprises the step of:

transporting the processing information from the processing locations to the processing location having the second central queue.

5. The method of claim 2, further comprising the steps of:

sequentially retrieving the data from the second central queue following the step of creating; and processing the data retrieved from the second central queue.

6. The method of claim 1, further comprising the step of:

at each processing location, generating the processing information for each data transported thereby, the processing information being maintained by the processing location during the step of maintaining.

7. The method of claim 1, further comprising the step of:
for each transport of data by a processing location, generating priority information relating to transporting the data, and maintaining the priority information at the processing location.

8. The method of claim 7, wherein the step of creating comprises the step of:
transporting the priority information to the processing location having the second central queue, the second central queue being created based upon the processing information and the priority information maintained in the processing locations.

9. A distributed processing network, comprising:
a plurality of processing units in communication with each other, a first processing unit having a first central queue for processing data provided from each processing unit, each processing unit comprising:
a data transport device for transporting data from each processing unit to the first central queue for subsequent processing of the data, and
a memory device for maintaining data transported to the first central queue and processing information corresponding to each data transported by the data transport device, the data and respective processing information being removed from the memory device upon the corresponding data being removed from the first central queue; and
a second processing unit of the plurality of processing units including a queue generating device for creating a second central queue in the second processing unit, the second central queue substantially matching the first central queue, the second central queue being generated in response to an affirmative determination that the first processing unit experienced a failure, the second central queue being generated by the queue generating device based upon the processing information maintained in the processing units.

10. The distributed processing network of claim 9, wherein:
upon the affirmative determination that the first processing unit experienced the failure, each processing unit transports data maintained in its respective memory device to the second central queue.

11. The distributed processing network of claim 10, wherein:
upon the affirmative determination that the first processing unit experienced the failure, each processing unit transports the processing information to the second central queue; and
the second processing unit determines the order of processing the data from the processing units based upon the processing information provided by the processing units.

12. The distributed processing network of claim 11, wherein:
data in the second central queue is sequentially retrieved therefrom corresponding to the determined processing order.

13. The distributed processing network of claim 9, wherein:
the processing information comprises priority information corresponding to data transported to the first central queue.

14. The distributed processing network of claim 9, wherein:
the data transport device and memory device of each processing unit comprise software and hardware.

15. A processing unit configurable for communicating within a distributed processing network having a first central queue, comprising:
a data transport device for transporting data to the first central queue for subsequent processing of the data;
a memory device for maintaining data transported to the first central queue and processing information corresponding to each data transported by the data transport device; and
a queue generating device, in communication with the data transport device, for providing to a second central queue data previously transported to the first central queue and the corresponding processing information, responsive to an indication that the first central queue experienced a failure;
wherein the data transport device and queue generating device comprise a processor and corresponding instruction code therefor, the instruction code controlling the processor to transport data to the first central queue and the second central queue, generate the processing information and maintain the transported data in the memory device.

16. The processing unit of claim 15, wherein:
the processing information corresponding to data transported to the first central queue comprises a time stamp of the transport time of the data.

17. The processing unit of claim 15, further comprising:
a record generating device for generating the processing information relating to each data transport by the processing unit, the processing information comprising one of temporal information and priority information for each data transported to the first central queue, the priority information specifying a degree of priority for processing the corresponding data.

18. The processing unit of claim 15, wherein:
the queue generating device transports to the second central queue at least some of the data in the memory device previously transported to the first central queue, and transports to the second central queue the processing information corresponding to the data transported.

19. A method of maintaining a queue in a distributed processing network having a first central queue for sequentially processing data, comprising the steps of:
transporting data to the first central queue for subsequent processing of the data;
maintaining data transported to the first central queue and transport information corresponding to each data transported to the first central queue in a local queue;
removing the data and corresponding transport information from the local queue upon the corresponding data being removed from the first central queue; and
transporting the data previously transported to the first central queue to a second central queue in response to an indication that the first central queue is associated with a failure.

20. The method of claim 19, wherein:
the transport information comprises a time stamp identifying the time the corresponding data was transported to the first central queue.

21. The method of claim 19, wherein:
the transport information comprises priority information for processing of the corresponding data in the distributed processing network.

22. The method of claim 19, further comprising the step of:

creating the second central queue to substantially match the first central queue.

23. The method of claim 22, further comprising the step of:

transporting to the second central queue the transport information corresponding to the data transported to the second central queue, in response to an indication that the first central queue is associated with a failure; and wherein the step of creating the second central queue to substantially match the first central queue determines the processing order of the data received by the second central queue based upon the transport information sent to the second central queue.

24. A computer program product including a computer readable medium having computer readable program code means embodied thereon, for maintaining a first central queue in a distributed processing network for sequentially processing data, the computer program product comprising:

first computer readable program code means for transporting data to the first central queue for subsequent processing of the data;

second computer readable program code means for maintaining in a local queue data transported to the first central queue and transport information corresponding to each data transported to the first central queue and removing the data and corresponding transport information from the local queue upon the corresponding data being removed from the first central queue; and third computer readable program code means for transporting to a second central queue data previously transported to the first central queue in response to an indication that the first central queue is associated with a failure.

25. The computer program product of claim 24, wherein:

the transport information comprises a time stamp identifying the time the corresponding data was transported to the first central queue.

26. The computer program product of claim 24, wherein:

the transport information comprises priority information for processing of the corresponding data in the distributed processing network.

27. The computer program product of claim 24, further comprising:

a fourth computer readable program code means for creating the second central queue to substantially match the first central queue.

28. The computer program product of claim 27, further comprising:

a fifth computer readable program code means for transporting to the second central queue the transport information corresponding to the data transported to the second central queue, in response to an indication that the first central queue is associated with a failure; and wherein the fourth computer readable program code means creates the processing order of data in the second central queue based upon the transport information sent to the second central queue.

\* \* \* \* \*